(12) United States Patent
Seto et al.

(10) Patent No.: US 8,972,113 B2
(45) Date of Patent: Mar. 3, 2015

(54) ELECTRIC POWER STEERING SYSTEM

(75) Inventors: Junichi Seto, Utsunomiya (JP);
Kazuhiko Inaba, Ibaraki (JP); Norio Yamazaki, Utsunomiya (JP); Kouji Nakamura, Utsunomiya (JP); Satoshi Kawabe, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 13/881,308

(22) PCT Filed: Oct. 26, 2011

(86) PCT No.: PCT/JP2011/005958
§ 371 (c)(1),
(2), (4) Date: Apr. 24, 2013

(87) PCT Pub. No.: WO2012/073426
PCT Pub. Date: Jun. 7, 2012

(65) Prior Publication Data
US 2013/0238196 A1    Sep. 12, 2013

(30) Foreign Application Priority Data
Nov. 29, 2010    (JP) ................. 2010-265491

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *B62D 5/04* | (2006.01) | |

(52) U.S. Cl.
CPC ............ *B62D 5/0472* (2013.01); *B62D 5/0469* (2013.01)

USPC .............................................. 701/42; 701/41

(58) Field of Classification Search
CPC ...................................................... B62D 5/0469
See application file for complete search history.

(56) References Cited

U.S. PATENT DOCUMENTS

| | | | | |
|---|---|---|---|---|
| 5,198,981 | A | * | 3/1993 | Collier-Hallman et al. ..... 701/42 |
| 5,247,441 | A | * | 9/1993 | Serizawa et al. ................ 701/41 |
| 5,398,953 | A | | 3/1995 | Shimizu |

FOREIGN PATENT DOCUMENTS

| | | |
|---|---|---|
| JP | 06-56046 A | 3/1994 |
| JP | 10-329740 A | 12/1998 |
| JP | 2001-315659 A | 11/2001 |
| JP | 2002-120743 A | 4/2002 |
| JP | 2006-281880 A | 10/2006 |
| JP | 2007-099053 A | 4/2007 |

OTHER PUBLICATIONS

Extended European Search Report, EP Application No. 11845964.3 mailing date May 30, 2014.

\* cited by examiner

*Primary Examiner* — Yonel Beaulieu
*Assistant Examiner* — Lail Kleinman
(74) *Attorney, Agent, or Firm* — Carrier Blackman & Associates, P.C.; Joseph P. Carrier; Fulchand P. Shende (57) ABSTRACT

Provided is an electric power steering system that prevents the oscillation of the steering wheel at each steering stroke end. If the steering stroke end flag Fse is 1 or if the determination result is Yes in step S8, the EPS-ECU (21) determines if the right steering flag (Fdrc) is 1 in step S10. If the determination result is Yes, it is then determined if the steering torque difference base value (Dtsb) is positive in step S11. If the determination result of step S11 is Yes, the EPS-ECU (21) uses the steering torque difference base value (Dtsb) as the steering torque difference (Dts) in step S12. If the determination result is No, the steering torque difference (Dts) is given by a value 0 in step S13, and the control process is concluded.

8 Claims, 11 Drawing Sheets

ELECTRIC POWER STEERING SYSTEM

CROSS-REFERENCED TO RELATED APPLICATIONS

This application is a National Stage entry of International Application PCT/JP2011/005958 filed Oct. 26, 2011, which claims priority to Japanese Application No. 2010-265491, filed Nov. 29, 2010, the disclosure of these prior applications are hereby incorporated in their entirety by reference.

TECHNICAL FIELD

The present invention relates to an electric power steering system for use in a vehicle, and in particular to a technology for preventing the oscillation of the steering wheel at each stroke end of the electric power steering system.

BACKGROUND OF THE INVENTION

Electric power steering systems (EPS) which derive a steering assist torque from an electric motor are being preferred over more conventional hydraulic power steering systems in recent times. As an electric power steering system relies on a car battery for powering the electric motor, the power output of the engine is not directly diverted from the engine for the power steering system, and the electric motor is powered only when a steering assist is required. Therefore, the fuel economy may be improved, and control by an ECU can be easily implemented.

In a conventional EPS, because the assist torque was entirely dependent on the steering torque of the vehicle operator, the inertia of the electric motor and frictions in various parts of the systems were not taken into account, and this caused some impairment in the steering feel. Based on such considerations, it was proposed to obtain a target steering torque (target centering torque) from a map based on the steering angle of the steering wheel, and to feedback control the assist torque according to the difference (steering torque difference) between the input steering torque (actual steering torque) obtained from a steering torque sensor and the target steering torque (see Patent Document 1).

Meanwhile, the steering geometry may consist of either Ackemann geometry where all of the wheels are caused to be steered around a common point and parallel geometry where all of the steerable wheels (typically front wheels) are steered by a same angle. By using Ackermann geometry, the side slip of the steerable wheels is controlled during low speed turn, and the wear of the tires and the rolling resistance to the tires can be reduced. However, in high speed turn, the direction of the cornering force of the tires may not coincide with that of the centrifugal force acting thereon. Therefore, in practice, the steering geometry of a typical four-wheel vehicle is set to be intermediate between Ackermann geometry and parallel geometry (or Ackermann ratio being anywhere between 30 and 70%), instead of pure Ackemann geometry (or Ackermann ratio being 100%) (see Patent Document 2).

BRIEF SUMMARY OF THE INVENTION

Task to be Accomplished by the Invention

According to the method disclosed in Patent Document 1 which performs a feedback control of the assist torque according to the steering torque difference, the impairment of steering feel is reduced, and the steering kickback caused by the irregularities and ruts in the road surface can be avoided.

However, it was discovered that depending on the selection of the Ackermann ratio, some problems may be created at each steering stroke end (or when the steering wheel is turned to either extreme end).

Figure 10:
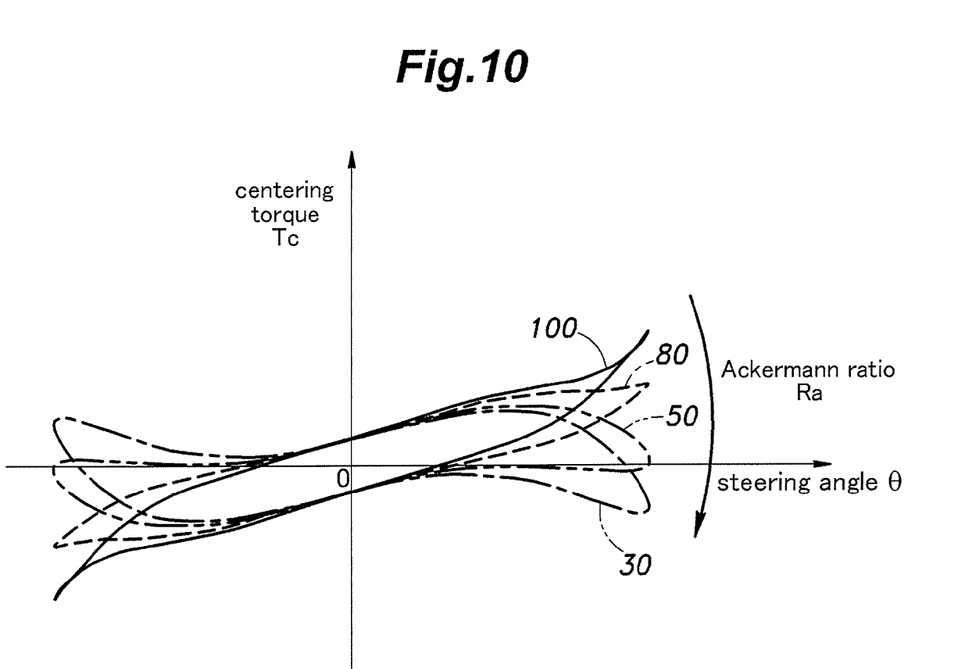
FIG. 10 is a graph showing the relationship between the steering angle θ and the centering torque Tc in an extremely low speed turn.

FIG. 10 shows the relationship between the steering wheel angle (steering angle θ) and the mechanical centering torque Tc (owing to the geometry of the steering mechanism) that is produced in an extremely low speed (5 km/h) turn. As can be seen from this graph, when the Ackermann ratio Ra is small (50-30, for instance), the centering torque Tc may become extremely small at each steering stroke end (or the centering torque may even act in the direction to increase the steering angle in contrary to the normal case). Therefore, if the vehicle operator turns the steering wheel towards a steering stroke end, owing to the increase in the difference between the target steering torque Tt and the centering torque Tc, the electric motor continually applies an assist torque to the steering mechanism in the direction to return the steering wheel to the neutral position in an effort to reduce the steering torque difference to zero.

Figure 11:
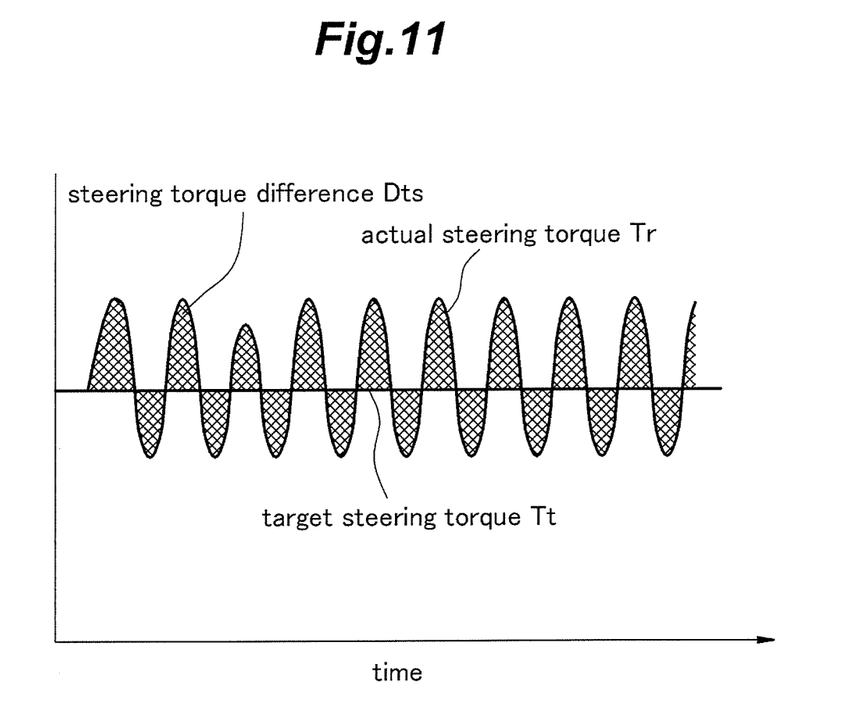
FIG. 11 is a graph showing the changes of the target steering torque and the actual steering torque with time at a steering stroke end in a conventional system.

When the vehicle operator further turns the steering wheel until the steering stroke end is reached (by hitting a mechanical limit), the steering wheel is further forced in the same steering direction (an excessive turning of the steering wheel by the steering effort of the vehicle operator), and this causes a sharp increase in the actual steering torque. This in turn causes the assist torque to be reduced in an effort to reduce the torque difference to zero, and the steering wheel is then caused to turn in the returning direction (opposite to the steering direction). As the resulting displacement of the steering wheel from the steering stroke end causes a reduction in the actual steering torque, the assist torque is again increased in an effort to reduce the steering torque difference, thereby causing the steering wheel to be turned to the steering stroke end once again. This process is repeated such that the actual steering torque Tr increases and decreases around the target steering torque Tt (or the steering torque difference Dts (shown by cross hatched areas) alternates between positive and negative values) causing rapid changes in the assist torque without attenuating over time. As a result, the vehicle operator may experience an unfamiliar or even unpleasant oscillation of the steering wheel at each steering stroke end.

The present invention was made in view of such a problem of the prior art, and has a primary object to provide an electric power steering system that can avoid the oscillation of the steering wheel at each steering stroke end.

Means to Accomplish the Task

According to a first aspect of the present invention, there is provided an electric power steering system, comprising: an electric steering assist motor for applying an assist force to a steering mechanism; a steering angle detecting means for detecting a steering angle of a steering wheel; a target steering torque setting means for setting a target steering torque of the steering wheel according to a detection result of the steering angle detecting means; an actual steering torque detecting means for detecting an actual steering torque applied to the steering wheel by a vehicle operator; a steering torque difference computing means for computing a difference between the target steering torque and the actual steering torque as a steering torque difference; a target drive current setting means for setting a target drive current according to the steering torque difference; and a motor drive control means for controlling the steering assist motor according to the target drive current; wherein the steering torque difference is given as zero when the actual steering torque is greater than the target steering torque in a steering angle advancing direction by more than a prescribed value.

According to a second aspect of the present invention, the prescribed value is zero.

According to a third aspect of the present invention, the electric steering system further comprises a steering stroke end determining means for determining that the steering wheel is adjacent to a steering stroke end, wherein the steering torque difference is given by zero only when a determination result of the steering stroke end determining means is affirmative, and the actual steering torque is greater than the target steering torque by a prescribed value.

According to a fourth aspect of the present invention, the steering stroke end determining means determines that the steering wheel is adjacent to the steering stroke end when the steering angle of the steering wheel detected by the steering angle detecting means is more advanced in steering angle than a prescribed stroke end determining angle.

According to a fifth aspect of the present invention, the steering stroke end determining means determines that the steering wheel is adjacent to the steering stroke end when the actual steering torque detected by the actual steering torque detecting means is greater than a prescribed stroke end determining torque.

Effect of the Invention

According to the present invention, the steering torque difference is given as zero so that the rotation of the steering in a retreating steering direction may be avoided when the actual steering torque is greater than the target steering torque. Thereby, the steering torque difference is prevented from alternating between positive and negative values, and is itself caused to be attenuated. As a result, the oscillation of the steering wheel that may cause an unfamiliar sensation or a discomfort can be controlled.

DETAILED DESCRIPTION OF THE PREFERRED EMBODIMENT(S)

Now an automotive electric power steering system embodying the present invention and a modified embodiment thereof are described in the following in more detail with reference to the appended drawings.
[Embodiment]
<<Structure of the Embodiment>>

Figure 1:
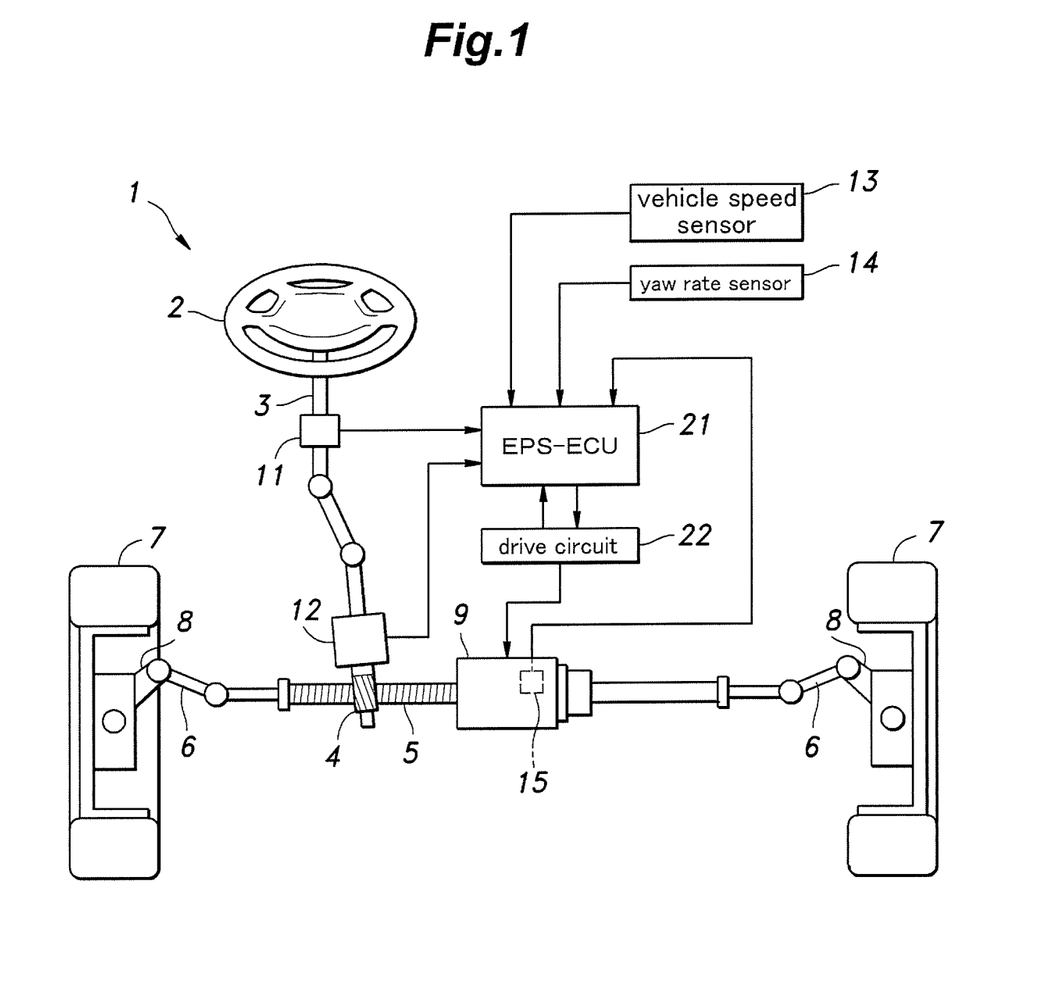
FIG. 1 is a schematic diagram showing an electric power steering system embodying the present invention.

Referring to FIG. 1, the electric power steering system 1 comprises a pinion 4 connected to a steering wheel 2 via a steering shaft 3, and a rack and pinion mechanism including a rack 5 meshing with the pinion 4 and configured to reciprocate in the lateral direction. Each end of the rack 5 is connected to a knuckle arm 8 of a corresponding front wheel 7 via a tie rod 6 so that the front wheels 7 are steered according to the angular movement of the steering wheel 2 caused by the steering effort of the vehicle operator. The rack 5 is coaxially incorporated with a steering assist mechanism 9 consisting of gears and an electric motor so that the steering effort of the vehicle operator is reduced by the assist torque produced by this steering assist mechanism 9.

A steering angle sensor 11 is provided in an upper part of the steering shaft 3 for detecting the steering angle of the steering wheel 2, and a steering torque sensor 12 for detecting the steering torque is provided adjacent to the pinion 4. A vehicle speed sensor 13 for detecting the traveling speed of the vehicle and a yaw rate sensor 14 for detecting the actual yaw rate of the vehicle body are provided in suitable parts of the vehicle body. The steering assist mechanism 9 is incorporated with a resolver 15 for detecting the angular position of the output shaft of the electric motor.

The output signals of these sensors 11 to 15 are forwarded to a steering control unit (EPS-ECU) 21 which is responsible for the overall control of the electric power steering system 1. The EPS-ECU 21 includes a microcomputer, ROM, RAM, peripheral circuits, an input/output interface, and various driver circuits such that a target control value (target current) is determined from the output signals, and is forwarded to a drive circuit 22. The drive circuit 22 consists of a FET bridge circuit or the like, and supplies electric power to the steering assist mechanism 9 according to the target control value determined by the EPS-ECU 21. The assist torque that is supplied from the steering assist mechanism 9 to the rack 5 is determined by these components.
<EPS-ECU>

Figure 2:
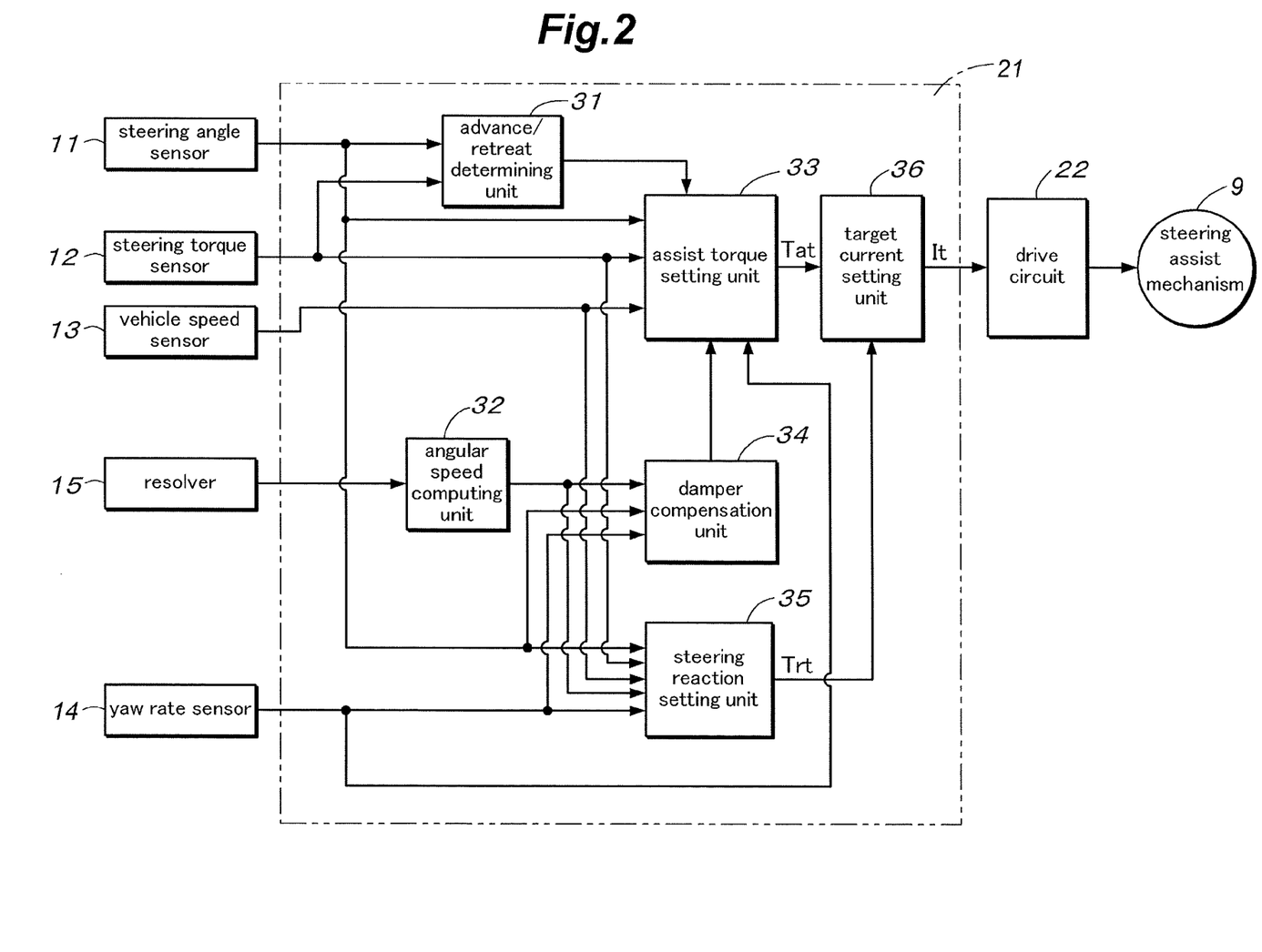
FIG. 2 is a block diagram showing the overall structure of the electric power steering system of the embodiment.

Referring to FIG. 2, the EPS-ECU 21 is internally provided with an advance/retreat determining unit 31, an angular speed computing unit 32, an assist torque setting unit 33, a damper compensation unit 34, a steering reaction setting unit 35 and a target current setting unit 36.

The advance/retreat determining unit 31 determines if the steering direction is in the advancing direction (away from the neutral position) or in the retreating direction (towards the neutral position) according to the output signals of the steering angle sensor 11 and the steering torque sensor 12, and forwards the determination result to the assist torque setting unit 33. The angular speed computing unit 32 computes the angular speed of the steering assist mechanism 9 according to the output signal of the resolver 15, and forwards the obtained angular speed signal to the damper compensation unit 34. The damper compensation unit 34 computes a damping compensation value for the steering assist mechanism 9, and forwards this value to the assist torque setting unit 33.

The assist torque setting unit 33 includes a steering torque difference computing unit 40 and other components as will be described hereinafter, and determines an assist torque target value Tat according to the input signals from the vehicle speed sensor 13, the yaw rate sensor 14, the damper compensation unit 34 and so on, and forwards this value to the target current setting unit 36.

The steering reaction setting unit 35 determines a steering reaction target value Trt according to the output signals from the steering angle sensor 11, the steering torque sensor 12, the vehicle speed sensor 13, the yaw rate sensor 14 and so on, and the output signal from the angular speed computing unit 32, and forwards this value to the target current setting unit 36.

The target current setting unit 36 determines a target current It according to the assist torque target value Tat forwarded from the assist torque setting unit 33 and the steering reaction target value Trt forwarded from the steering reaction setting unit 35, and forwards the obtained target current It to the drive circuit 22.
<Steering Torque Difference Computing Unit>

Figure 3:
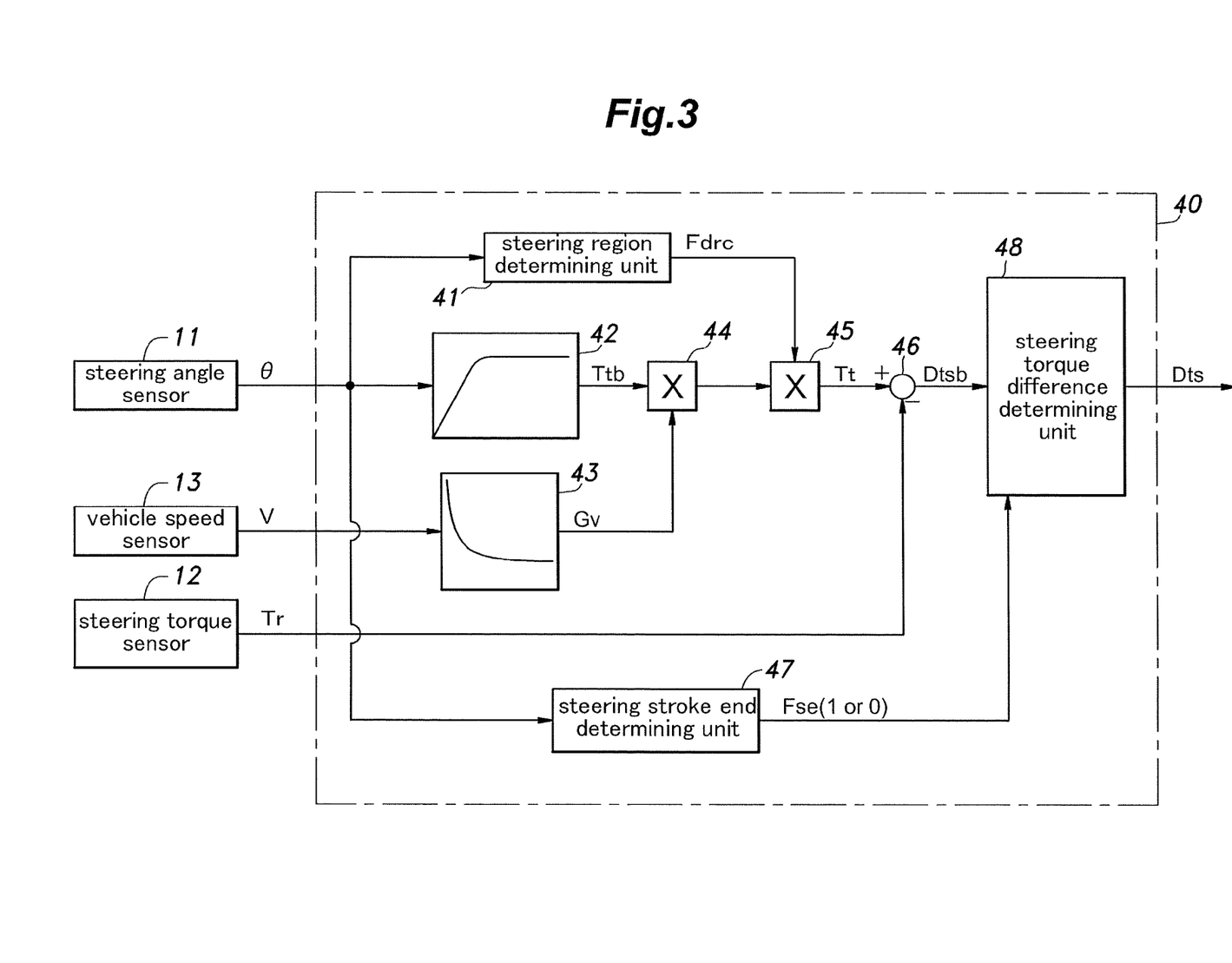
FIG. 3 is a block diagram showing the overall structure of a steering torque difference computing unit of the embodiment.

Referring to FIG. 3, the steering torque difference computing unit 40 comprises a steering region determining unit 41, a target steering torque base value setting unit 42, a vehicle speed gain setting unit 43, a first multiplier 44, a second multiplier 45, an adder 46, a steering stroke end determining unit 47 and a steering torque difference determining unit 48.

Figure 4:
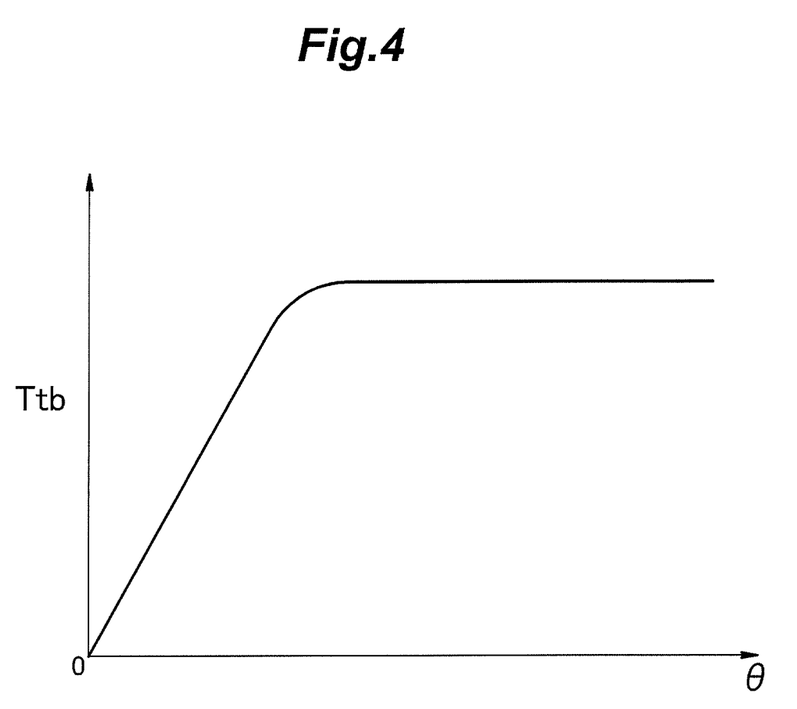
FIG. 4 is a base value map when the steering angle is being increased that is used in the embodiment.
Figure 5:
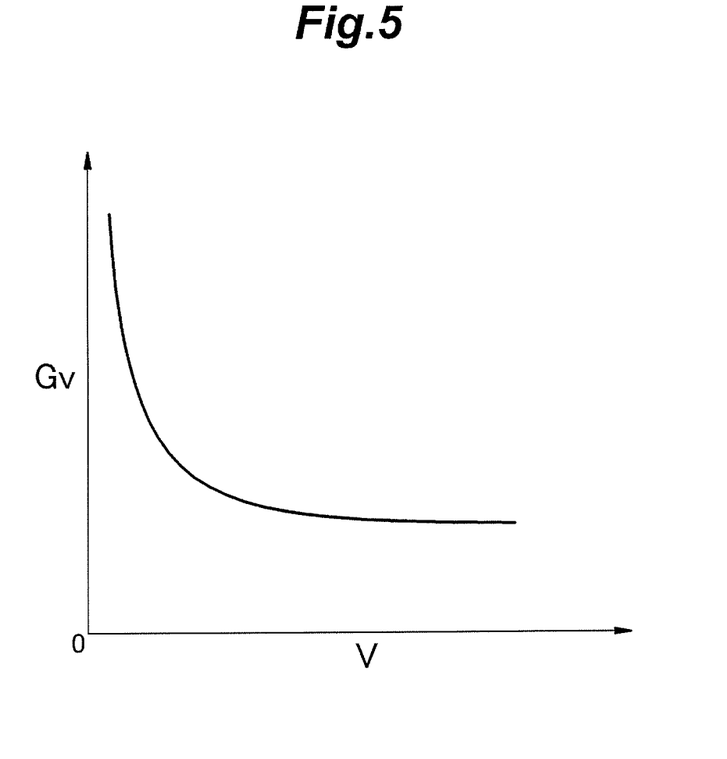
FIG. 5 is a vehicle gain map used in the embodiment.

The steering region determining unit 41 determines the current steering region (which side of the neutral position the steering wheel 2 is located in) according to the output signal of the steering torque sensor 12, and sets a right steering flag Fdrc to 1 when the steering wheel is turned to the right and to 0 when the steering wheel is turned to the left. The target steering torque base value setting unit 42 sets a target steering torque base value Ttb according to the steering angle θ obtained from the steering angle sensor 11 as shown by a base value map given in FIG. 4. The vehicle speed gain setting unit 43 sets a vehicle speed gain Gv according to the vehicle speed V obtained from the vehicle speed sensor 13 as shown by a vehicle speed gain map given in FIG. 5. The first multiplier 44 modifies the target steering torque base value Ttb according to the vehicle speed gain Gv. The second multiplier 45 determines the sign of the target steering torque base value Ttb according to the determination result of the steering region determining unit 41, and produces a target steering torque Tt.

The adder 46 subtracts the actual steering torque Tr (the detection value of the steering torque sensor 12) from the target steering torque Ttgt, and produces a steering torque difference base value Dtsb. The steering stroke end determining unit 47 determines if the steering wheel 2 is near either steering stroke end, and produces a steering stroke end flag Fse (1 or 0) depending on the determination result. The steering torque difference determining unit 48 determines and produces a steering torque difference Dts according to the steering torque difference base value Dtsb and the steering stroke end flag Fse.

<<Mode of Operation of the Embodiment>>

When the vehicle in motion, the EPS-ECU 21 performs a steering assist control at a prescribed processing interval (10 ms, for instance). During the steering assist control, the assist torque setting unit 33 of the EPS-ECU 21 sets the assist torque target value Tat by performing a damper compensation on the steering torque difference Dts, and the steering reaction setting unit 35 of the EPS-ECU 21 sets the steering reaction torque Trt. The target current setting unit 36 of the EPS-ECU 21 then sets the target current It according to the assist torque target value Tat and the steering reaction torque Trt, and forwards the target current It to the drive circuit 22. Thereby, the prescribed assist torque is applied by the steering assist mechanism 9 to the rack 5, and the steering effort by the vehicle operator is reduced.

<Setting the Steering Torque Difference>

Figure 6:
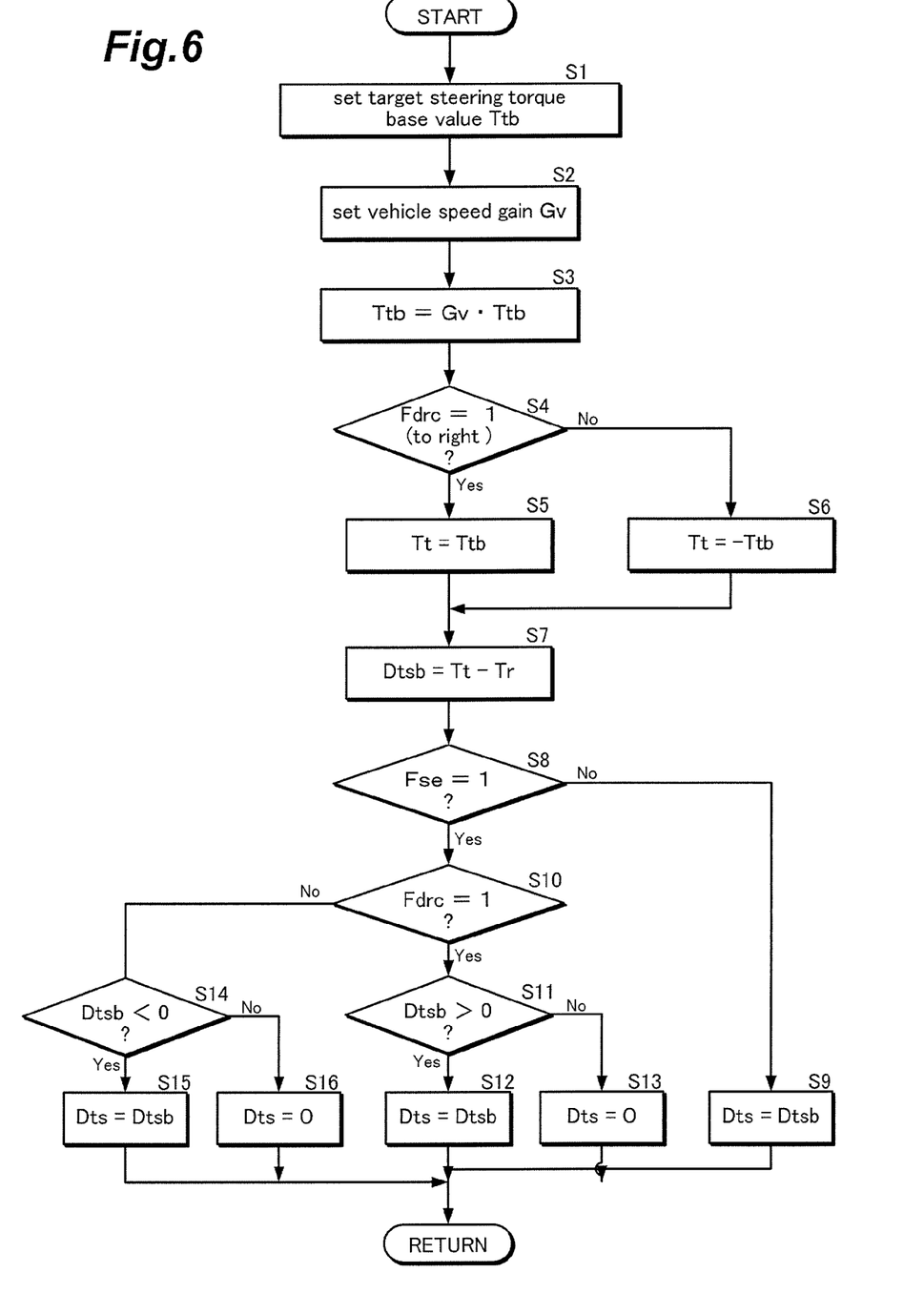
FIG. 6 is a flowchart showing the process of setting the steering torque difference that is used in the embodiment.

In parallel with the steering assist control discussed above, the EPS-ECU 21 performs a steering torque difference setting process shown in the flowchart of FIG. 6.

Upon starting the steering torque difference setting process, the EPS-ECU 21 sets the target steering torque base value Ttb according to the current steering angle θ in step S1, and sets the vehicle speed gain Gv according to the current vehicle speed in step S2. The target steering torque base value Ttb is then modified by the vehicle speed gain Gv in step S3.

The EPS-ECU 21 determines if the current angular position of the steering wheel 2 is to the right of the neutral position in step S4. If the determination result is Yes, the target steering torque base value Ttb is directly set as the target steering torque Tt in step S5. If the determination result is No, the target steering torque base value Ttb with a negative sign put thereon is set as the target steering torque Tt in step S6. In either case, the EPS-ECU 21 computes and produces the steering torque difference base value Dtsb by subtracting the actual steering torque Tr from the target steering torque Tt in step S7.

The EPS-ECU 21 then determines if the steering stroke end flag Fse is 1 in step S8. If the determination result is No in step S8 (or if the steering stroke end flag Fse is 0), the steering torque difference base value Dtsb is used as the steering torque difference Dts in step S9, and the control process is concluded.

If the steering stroke end flag Fse is 1 or if the determination result is Yes in step S8, the EPS-ECU 21 determines if the right steering flag Fdrc is 1 in step S10. If the determination result is Yes, it is then determined if the steering torque difference base value Dtsb is positive in step S11. If the determination result of step S11 is Yes, the EPS-ECU 21 uses the steering torque difference base value Dtsb as the steering torque difference Dts in step S12. If the determination result is No, the steering torque difference Dts is given by a value 0 in step S13, and the control process is concluded.

Figure 7:
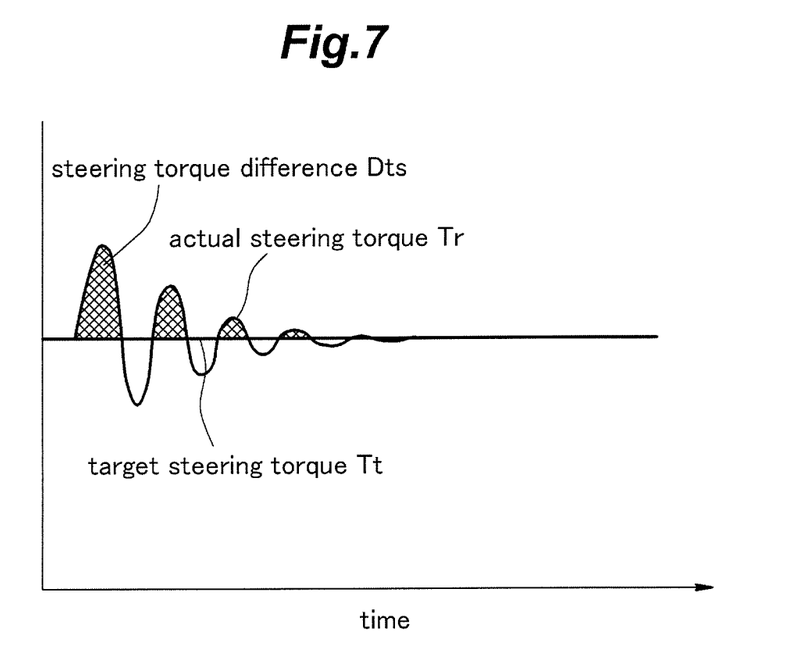
FIG. 7 is a graph showing the changes of the target steering torque and the actual steering torque with time at a steering stroke end according to the embodiment.

Thus, at the rightward steering stroke end, only the positive steering torque difference Dts (cross hatched areas) is produced, and no negative steering torque difference is produced. As a result, the retreating angular movement of the steering wheel 2 is not caused, and the positive steering torque difference Dts is rapidly attenuated so that the oscillation of the steering wheel 2 which was the problem with the conventional system is effectively prevented.

On the other hand, if the right steering flag Fdrc is 0, or the determination result is No in step S10, the EPS-ECU 21 determines if the steering torque difference base value Dtsb is negative in step S14. If the determination result of step S14 is Yes, the EPS-ECU 21 uses the steering torque difference base value Dtsb as the steering torque difference Dts in step S12. If the determination result of step S14 is No, the steering torque difference Dts is given by a value 0 in step S16, and the control process is concluded.

Thus, at the leftward steering stroke end, only the negative steering torque difference Dts is produced, and no positive steering torque difference is produced. As a result, the retreating angular movement of the steering wheel 2 is not caused, and the negative steering torque difference Dts is rapidly attenuated so that the oscillation of the steering wheel 2 which was the problem with the conventional system is effectively prevented similarly as at the right steering stroke end.

<Determination of a Steering Stroke End>

In the illustrated embodiment, the steering stroke end determining unit 47 determines that the current steering position is at a steering stroke end according to the steering angle θ obtained from the steering angle sensor 11. More specifically, steering stroke end determining unit 47 stores an angle between the neutral position of the steering wheel 2 to the steering stroke end (900 degrees, for instance; or 2.5 revolutions of the steering wheel 2), and determines the reaching of a steering stroke end and sets the steering stroke end flag Fse to 1 when the steering angle θ is within a prescribed margin (±5 degrees) defined about this stroke end angle.

Alternatively, the steering stroke end determining unit 47 may also determine that the current steering position is at a steering stroke end according to the actual steering torque Tr instead of the steering angle θ. More specifically, the steering stroke end determining unit 47 stores a steering torque that is expected to be exceeded when the steering wheel 2 has reached a steering stroke end (or a sharply increased steering torque which is produced upon reaching the steering stroke end greater than the normally encountered value) as a steering stroke end torque Tse, and determines the reaching of a steering stroke end and sets the steering stroke end flag Fse to 1 when the actual steering torque Tr has reached the steering stroke end torque Tse.

<Modified Embodiment>

The modified embodiment is similar to the previous embodiment as regard to the overall structure thereof, but differs therefrom in setting the steering torque difference to zero when the actual steering torque is greater than the target steering torque in a steering angle advancing direction, instead of actually determining the reaching of a steering stroke end.

<<Structure of the Modified Embodiment>>

Figure 8:
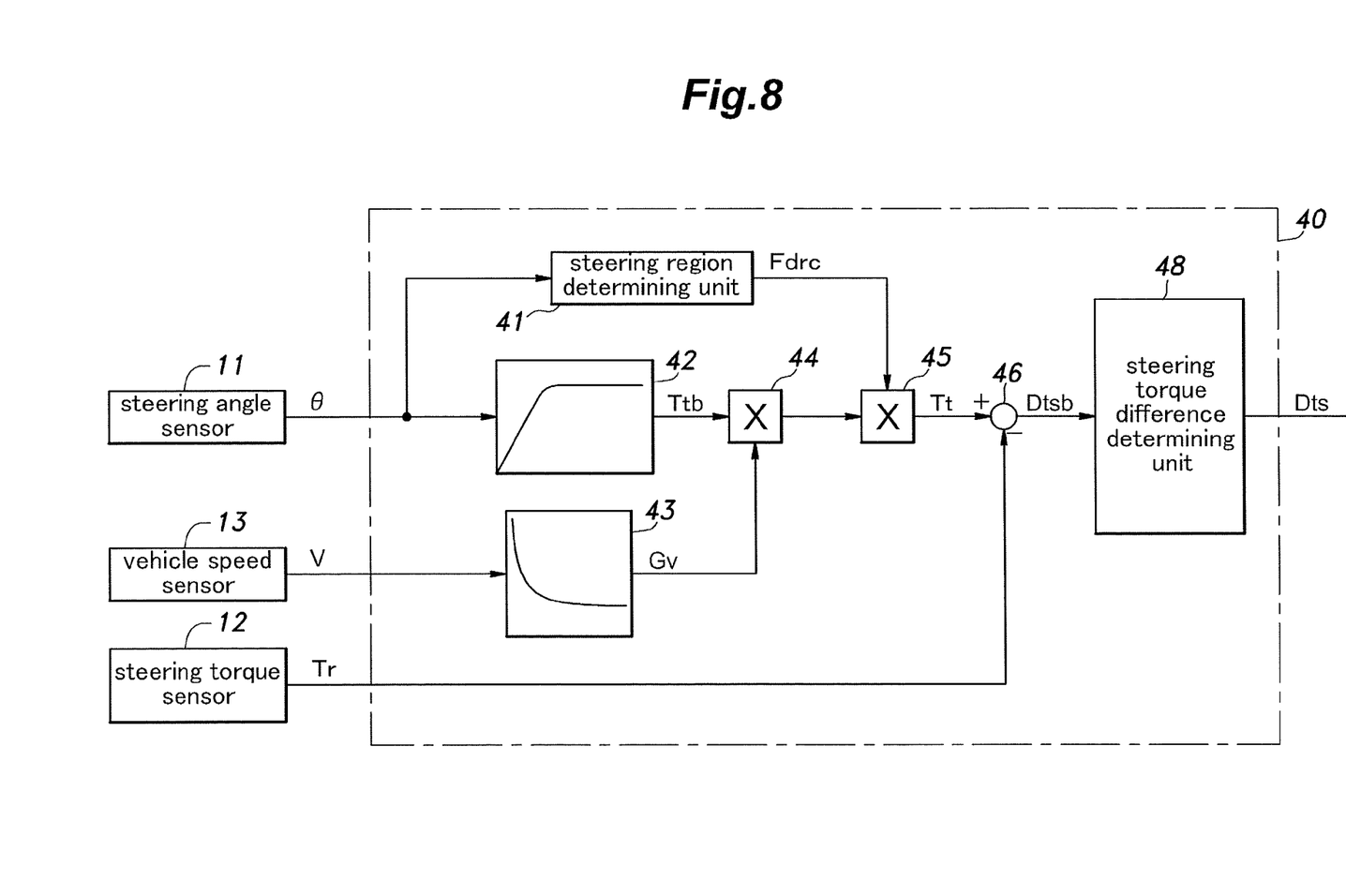
FIG. 8 is a block diagram showing the overall structure of a steering torque difference computing unit of a modified embodiment.

As shown in FIG. 8, the steering torque difference computing unit 40 comprises a steering region determining unit 41, a target steering torque base value setting unit 42, a vehicle speed gain setting unit 43, a first multiplier 44, a second multiplier 45, an adder 46 and a steering torque difference determining unit 48, but does not include a steering stroke end determining unit 47 as opposed to the previous embodiment.

<<Mode of Operation of the Modified Embodiment>>

A similar steering assist control is performed in the modified embodiment in a similar fashion as that of the previous embodiment, but differs therefrom in the process of setting the steering torque difference.

<Setting the Steering Torque Difference>

Figure 9:
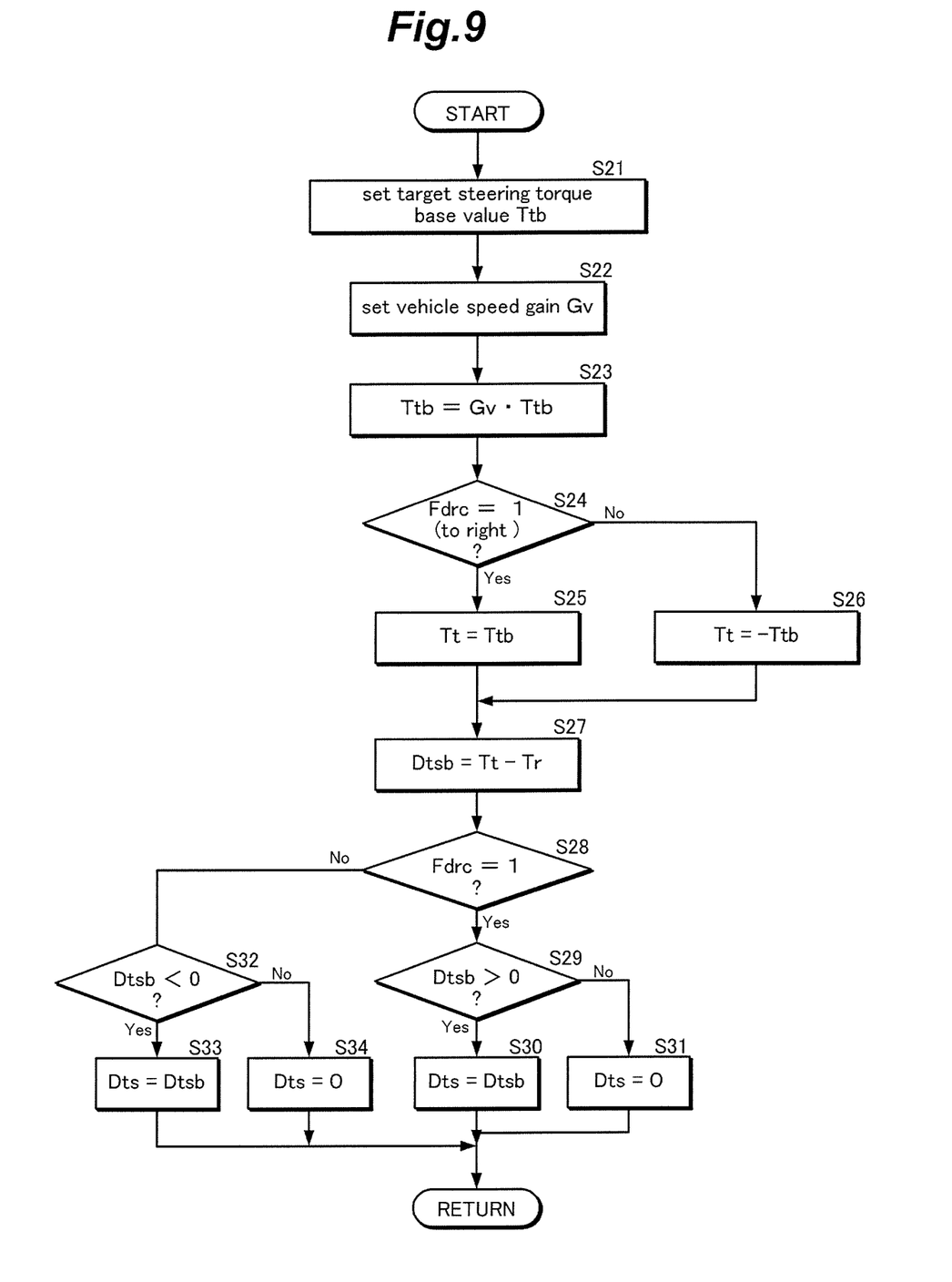
FIG. 9 is a flowchart showing the process of setting the steering torque difference that is used in the modified embodiment.

In parallel with the steering assist control discussed above, the EPS-ECU 21 performs a steering torque difference setting process shown in the flowchart of FIG. 9.

Upon starting the steering torque difference setting process, the EPS-ECU 21 sets the target steering torque base value Ttb according to the current steering angle θ in step S21, and sets the vehicle speed gain Gv according to the current vehicle speed in step S22. The target steering torque base value Ttb is then modified by the vehicle speed gain Gv in step S23.

The EPS-ECU 21 determines if the current angular position of the steering wheel 2 is to the right of the neutral position in step S24. If the determination result is Yes, the target steering torque base value Ttb is directly set as the target steering torque Tt in step S25. If the determination result is No, the target steering torque base value Ttb with a negative sign put thereon is set as the target steering torque Tt in step S26. In either case, the EPS-ECU 21 computes and produces the steering torque difference base value Dtsb by subtracting the actual steering torque Tr from the target steering torque Tt in step S27.

The EPS-ECU 21 then determines if the steering stroke end flag Fse is 1 in step S28. If the determination result is Yes, it is determined if the steering torque difference base value Dtsb is positive in step S29. If the determination result of step S29 is Yes, the EPS-ECU 21 uses the steering torque difference base value Dtsb as the steering torque difference Dts in step S30. If the determination result is No, the steering torque difference Dts is given by a value 0 in step S31, and the control process is concluded.

Thus, at the rightward steering stroke end, no negative steering torque difference Dts is produced (and hence no retreating rotation of the steering wheel 2 is caused). Therefore, the oscillation of the steering wheel 2 is prevented similarly as in the previous embodiment.

On the other hand, if the right steering flag Fdrc is 0, or the determination result is No in step S28, the EPS-ECU 21 determines if the steering torque difference base value Dtsb is negative in step S32. If the determination result of step S32 is Yes, the EPS-ECU 21 uses the steering torque difference base value Dtsb as the steering torque difference Dts in step S33. If the determination result of step S32 is No, the steering torque difference Dts is given by a value 0 in step S34, and the control process is concluded.

Thus, at the leftward steering stroke end, no positive steering torque difference is produced (and hence no advancing rotation of the steering wheel 2 is caused). Therefore, the oscillation of the steering wheel 2 is prevented similarly as in the previous embodiment.

Although the present invention has been described in terms of a preferred embodiment and a modified embodiment thereof, the present invention is not limited by such embodiments. For instance, in the foregoing embodiments, the present invention was applied to an EPS using a brushless motor as the assist motor for the steering assist mechanism, and the angular speed detecting unit detected the angular speed of the assist motor according to the output signal of the resolver, but the present invention is equally applicable to an EPS using a brush motor as the assist motor. In such a case, the angular speed of the assist motor can be detected by time differentiating the detected value of the steering angle sensor. The steering torque difference was given a value 0 when the actual steering torque is greater than the target steering torque in a steering angle advancing direction in the foregoing embodiments (when the steering torque difference is negative in the case of a rightward steering), but the steering torque difference may also be given a value 0 when the actual steering torque is greater than the target steering torque in a steering angle advancing direction to a prescribed extent (or by more than a prescribed amount). In such a case, the prescribed value may be selected at any desired value including a negative value. The specific structures of the electric power steering system and the EPS-ECU as well as the details of the control processes therefor may be variously modified without departing from the spirit of the invention.

GLOSSARY 1 electric power steering system
2 steering wheel
5 rack
7 front wheel
9 steering assist mechanism
11 steering angle sensor
12 steering torque sensor
21 steering control unit
21 EPS-ECU
33 assist torque setting unit
40 steering torque difference computing unit 41 steering region determining unit
47 steering stroke end determining unit
48 steering torque difference determining unit

The invention claimed is:

1. An electric power steering system, comprising:
an electric steering assist motor that applies an assist force to a steering mechanism;
a steering angle detector that detects a steering angle of a steering wheel;
a target steering torque setting unit that sets a target steering torque of the steering wheel according to a detection result of the steering angle detecting means detector;
an actual steering torque detector that detects an actual steering torque applied to the steering wheel by a vehicle operator;
a steering torque difference computing unit that computes a difference between the target steering torque and the actual steering torque as a steering torque difference;
an effective steering torque difference determination unit that determines and produces an effective steering torque difference, such that the effective steering torque difference is given as zero when the actual steering torque is greater than the target steering torque in a steering angle advancing direction by more than a prescribed value and otherwise the effective steering torque difference is given as the steering torque difference computed by the steering torque difference computing unit;
a target drive current setting unit that sets a target drive current according to the effective steering torque difference; and
a motor drive circuit that drives the steering assist motor according to the target drive current.

2. The electric power steering system according to claim 1, wherein the prescribed value is zero.

3. The electric power steering system according to claim 1, further comprising a steering stroke end determining unit that determines weather the steering wheel is adjacent to a steering stroke end, wherein the steering torque difference is given as zero only when a determination result of the steering stroke end determining unit is affirmative, and the actual steering torque is greater than the target steering torque by a prescribed value.

4. The electric power steering system according to claim 3, wherein the steering stroke end determining unit determines that the steering wheel is adjacent to the steering stroke end when the steering angle of the steering wheel detected by the steering angle detector is more advanced in steering angle than a prescribed stroke end determining angle.

5. The electric power steering system according to claim 3, wherein the steering stroke end determining unit determines that the steering wheel is adjacent to the steering stroke end when the actual steering torque detected by the actual steering torque detector is greater than a prescribed stroke end determining torque.

6. The electric power steering system according to claim 2, further comprising a steering stroke end determining unit that determines weather the steering wheel is adjacent to a steering stroke end, wherein the steering torque difference is given as zero only when a determination result of the steering stroke end determining unit is affirmative, and the actual steering torque is greater than the target steering torque by a prescribed value.

7. The electric power steering system according to claim 6, wherein the steering stroke end determining unit determines that the steering wheel is adjacent to the steering stroke end when the steering angle of the steering wheel detected by the steering angle detector is more advanced in steering angle than a prescribed stroke end determining angle.

8. The electric power steering system according to claim 6, wherein the steering stroke end determining unit determines that the steering wheel is adjacent to the steering stroke end when the actual steering torque detected by the actual steering torque detector is greater than a prescribed stroke end determining torque.

* * * * *